United States Patent
Greiner et al.

(10) Patent No.: US 11,670,095 B2
(45) Date of Patent: Jun. 6, 2023

(54) METHOD FOR DETERMINING SUPPORT POINTS FOR ESTIMATING A PROGRESSION OF ROADSIDE DEVELOPMENT OF A ROAD

(71) Applicant: Bayerische Motoren Werke Aktiengesellschaft, Munich (DE)

(72) Inventors: Gero Greiner, Munich (DE); Ting Li, Munich (DE); Christian Ruhhammer, Shanghai (CN); Andreas Zorn-Pauli, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 464 days.

(21) Appl. No.: 16/981,533

(22) PCT Filed: May 27, 2019

(86) PCT No.: PCT/EP2019/063599
§ 371 (c)(1),
(2) Date: Sep. 16, 2020

(87) PCT Pub. No.: WO2020/001894
PCT Pub. Date: Jan. 2, 2020

(65) Prior Publication Data
US 2021/0117699 A1    Apr. 22, 2021

(30) Foreign Application Priority Data

Jun. 29, 2018 (DE) .................. DE10 2018 210 692

(51) Int. Cl.
*G06V 20/58* (2022.01)
*G06V 20/56* (2022.01)
(Continued)

(52) U.S. Cl.
CPC ............ *G06V 20/588* (2022.01); *G06V 20/58* (2022.01); *G08G 1/0108* (2013.01); *G06F 18/25* (2023.01)

(58) Field of Classification Search
CPC .... G06V 20/588; G06V 20/58; G08G 1/0108; G06F 18/25
See application file for complete search history.

(56) References Cited

U.S. PATENT DOCUMENTS

2017/0220878 A1    8/2017    Lakatos et al.

FOREIGN PATENT DOCUMENTS

DE    10 2016 201 304 A1    8/2017
DE    10 2016 003 935 A1    10/2017

OTHER PUBLICATIONS

International Search Report (PCT/ISA/210) issued in PCT Application No. PCT/EP2019/063599 dated Jul. 25, 2019 with English translation (six (6) pages).

(Continued)

*Primary Examiner* — Mathew Franklin Gordon
(74) *Attorney, Agent, or Firm* — Crowell & Moring LLP

(57) ABSTRACT

A method determines support points for estimating a progression of roadside development of a road. The method determines a position of a first support point in the surroundings of a vehicle; determines a plurality of regions in a travel direction and/or counter to the travel direction of the vehicle on the basis of the position of the first support point; and determines support points of roadside development for each of the determined regions in the travel direction, counter to the travel direction and left and right of the vehicle.

12 Claims, 2 Drawing Sheets

(51) Int. Cl.
*G08G 1/01* (2006.01)
*G06F 18/25* (2023.01)

(56) References Cited

OTHER PUBLICATIONS

German-language Written Opinion (PCT/ISA/237) issued in PCT Application No. PCT/EP2019/063599 dated Jul. 25, 2019 (eight (8) pages).
German-language Search Report issued in German Application No. 10 2018 210 692.4 dated Nov. 5, 2019 (five (5) pages).
Tanzmeister G et al., "Grid-Based Multi-Road-Course Estimation Using Motion Planning", IEEE Transactions on Vehicular Technology, Apr. 2016, pp. 1924-1935, vol. 65, Issue No. 4 (12 pages).
Danescu R. et al., "Stereovision-Based Side Lane and Guardrail Detection", IEEE Intelligent Transportation Systems Conference, 2006, pp. 1156-1161 (six (6) pages).
Alessandretti G., et al., "Vehicle and Guard Rail Detection Using Radar and Vision Data Fusion", IEEE Transactions on Intelligent Transportation Systems, Mar. 2007, pp. 95-105, vol. 8, Issue No. 1 (11 pages).

METHOD FOR DETERMINING SUPPORT POINTS FOR ESTIMATING A PROGRESSION OF ROADSIDE DEVELOPMENT OF A ROAD

BACKGROUND AND SUMMARY OF THE INVENTION

The invention relates to a method for determining support points for estimating a progression of a roadside development of a road. The invention also relates to a computer-readable medium for determining support points for estimating a progression of a roadside development of a road, to a system for determining support points for estimating a progression of a roadside development of a road, and to a vehicle comprising the system.

Methods for estimating a roadside development which initially calculate a group of trajectories which can be traveled along are known from the prior art. For selected trajectories which can be traveled along, roadside developments are estimated on the basis of obstacles relative to the selected trajectory which can be traveled along. An example of a trajectory-based estimation of roadside developments is described in the work of G. Tanzmeister et al., "Grid-Based Multi-Road-Course Estimation Using Motion Planning", IEEE Transactions on Vehicular Technology, pp. 1924-1935, 2015. Trajectory-based estimation of roadside developments has, however, the disadvantage that estimating the group of trajectories which can be traveled along requires a very large amount of computing capacity and memory for the calculation.

It is therefore an object of the invention to efficiently improve the determination of one or more support points for estimating a progression of a roadside development. In particular, it is an object of the invention to determine efficiently and robustly one or more support points for estimating a progression of a roadside development without using trajectories.

This object is achieved by means of the features of the independent claims. However, advantageous refinements and developments of the invention can be found in the dependent claims.

According to a first aspect, the invention is distinguished by a method for determining support points for estimating a progression of a roadside development of a road. The method can be a control-unit-implemented method or a computer-implemented method. The method is preferably executed on a control unit of a vehicle. The method can be executed on the control unit of the vehicle in such a way that the method can determine a set of support points in real time. The vehicle can be a vehicle which drives in partially automated, highly automated or fully automated fashion.

The method comprises ascertaining a first support point or a position of a first support point from a set of given obstacles in the surroundings of a vehicle. The set of given obstacles has preferably been ascertained, for example, by fusion of obstacle data from various sensors of the vehicle. The surroundings of the vehicle can be defined by a range of the sensors. The surroundings of the vehicle can additionally or alternatively be defined by predefined, vehicle-specific parameters. The method comprises determining a plurality of regions in a direction of travel of the vehicle on the basis of the ascertained first support point or the position of the first support point. The position of the first support point preferably represents a boundary of a first region in the direction of travel which is to the rear in the direction of travel of the vehicle, and from this boundary the front boundary of the first region and all the further regions and/or region boundaries are defined. A boundary or the boundaries of a region or of all the regions preferably runs/run laterally with respect to the vehicle. An axle of the vehicle, for example a rear axle or a front axle of the vehicle, is preferably used as a reference variable of a coordinate system, from which the position of the first support point and of all the further support points and the positions of the given obstacles relative to the vehicle can be defined. A number of regions can be permanently predefined and/or dependent on vehicle-specific parameters. For example, the number of regions can depend on the size of a region, of the length of a region in the direction of travel and/or on a sensor range of the vehicle. The method also comprises determining a set of support points of a roadside development for each of the determined regions, preferably in the direction of travel of the vehicle. For one region it may be possible to determine no support point, one support point or a plurality of support points. The set of support points of a region preferably comprises one support point at maximum.

The division of the surroundings of the vehicle into regions and the determination of support points for each region advantageously allows a support point for the estimation of a roadside development or the progression of the roadside development to be determined easily and efficiently. The vehicle can estimate the roadside development of the road without calculating a group of trajectories. The method can therefore be carried out efficiently in terms of computing capacity and memory requirement in real time on a control unit of the vehicle.

According to a first advantageous refinement, the first support point or the position of the first support point in the surroundings of the vehicle can be a position of an obstacle which lies, in terms of lateral distance, closest to a current position of the vehicle, in the surroundings of the vehicle, and/or the first support point or the position of the first support point in the surroundings of the vehicle can be a position of a roadside development which has been estimated by the vehicle which lies, in terms of lateral distance, closest to a current position of the vehicle, in the surroundings of the vehicle. In this way, it is possible to easily determine a first support point by means of which the regions can be divided in the direction of travel of the vehicle.

According to a further advantageous refinement, the set of support points in the lefthand surroundings of the vehicle in the direction of travel and the set of support points in the righthand surroundings of the vehicle in the direction of travel can be ascertained, and/or a plurality of regions can be determined on the basis of a position of the first support point in the lefthand surroundings of the vehicle in the direction of travel, and a plurality of regions can be determined on the basis of a position of the first support point in the righthand surroundings of the vehicle in the direction of travel, and/or the position of the first support point in the lefthand surroundings of the vehicle in the direction of travel and the position of the first support point in the righthand surroundings of the vehicle in the direction of travel can be different, and/or the regions in the lefthand surroundings of the vehicle in the direction of travel and the regions in the righthand surroundings of the vehicle in the direction of travel can be different. In this way, regions can be efficiently defined for the estimation of a lefthand roadside development and a righthand roadside development. The definition of different regions for the lefthand and righthand surroundings of the vehicle efficiently improves the determination of the support points or the set of support points for the respective surroundings of the vehicle.

According to a further advantageous refinement, each region can have a predefined fixed length, and/or the set of support points of a roadside development can comprise at maximum one support point for each of the determined regions. The predefined fixed length can be the same for the lefthand surroundings in the direction of travel and for the righthand surroundings of the vehicle in the direction of travel. In this way, the regions and the set of support points can easily be determined with low expenditure on computing.

According to a further advantageous refinement, the set of support points can be determined separately for each of the regions in the lefthand surroundings of the vehicle in the direction of travel for a lefthand roadside development, and for each of the regions in the righthand surroundings in the direction of travel for a righthand roadside development. In this way, the estimation of a lefthand and righthand roadside development can be efficiently improved. In addition, the robustness of the estimation of the roadside development for the lefthand and the righthand side of the road can be increased.

According to a further advantageous refinement, the determination of the set of support points of the roadside development for each of the determined regions can comprise ascertaining a starting position in a region next to the vehicle, wherein the starting position is a position of an obstacle in the region next to the vehicle which lies, in terms of lateral distance, closest to a current position of the vehicle, or is a position of a roadside development in the region next to the vehicle which has been estimated by the vehicle and which lies, in terms of lateral distance, closest to a current position of the vehicle. In this way, a starting position for the determination of the set of support points of a region can be ascertained efficiently.

According to a further advantageous refinement, the determination of the set of support points of the roadside development can also comprise for each of the determined regions determining a set of obstacles, in particular relevant obstacles, of a region in the direction of travel of the vehicle, ascertaining a subset of obstacles from the set of relevant obstacles of the region, wherein an obstacle from the set of obstacles is incorporated into the subset if there is no estimate of a roadside development, for example from a previous iteration of the method, and the lateral distance between a position of the obstacle and a preceding determined support point is not greater than a predefined maximum lateral distance, or an estimate of a roadside development is present, for example from a preceding iteration of the method, and the absolute value of the difference between the distance between the previous determined support point and the roadside development and the distance between a positon of the obstacle and the roadside development is not greater than a predefined maximum difference. In addition, the determination of the set of support points of the roadside development for each of the determined regions can comprise determining as the support point an obstacle from the subset of obstacles which are at a predefined relative distance, for example at the shortest lateral distance and/or the second shortest lateral distance and/or the n-shortest lateral distance, from the vehicle. In this way, the set of support points can be determined efficiently.

According to a further advantageous refinement, the method can also comprise determining a plurality of regions counter to the direction of travel of the vehicle on the basis of the first support point or the position of the first support point, and determining a set of support points of a roadside development for each of the determined regions counter to the direction of travel. In this way, additional support points counter to the direction of travel of the vehicle can be determined efficiently. The roadside development or the progression of the roadside development can be estimated more precisely if the support points are additionally ascertained counter to the direction of travel.

According to a further advantageous refinement, the method can also comprise estimating the progression of the roadside development of the road using the set of support points in the direction of travel and/or counter to the direction of travel by means of the vehicle. Known methods for estimating the roadside development are preferably used to estimate the roadside development or the progression of the roadside development by using the determined support points in the direction of travel and/or counter to the direction of travel of the vehicle. In this way, a roadside development or the progression of the roadside development can be ascertained.

According to a further aspect, the invention is distinguished by a computer-readable medium for determining support points for estimating a progression of a roadside development of a road, wherein the computer-readable medium comprises instructions which, when executed on a computer or a control unit, execute the method described above.

According to a further aspect, the invention is distinguished by a system for determining support points for estimating a progression of a roadside development of a road, wherein the system is designed to execute the method described above.

According to a further aspect, the invention is distinguished by a vehicle comprising the system described above for determining a support point for estimating a progression of a roadside development of a road.

Further features of the invention can be found in the claims, the figures and the description of the figures. All the features and combinations of features specified in the description and the features and combinations of features specified below in the description of the figures and/or shown solely in the figures can be used not only in the respectively specified combination but also in other combinations or else alone.

The invention is based on the concepts presented below.

A vehicle of the present invention can detect or sense static obstacles and boundaries of a road around itself. In other words, the vehicle can generate a 360° environmental model of surroundings of the vehicle. Examples of (road) obstacles and boundaries are sods of grass, crash barriers, concrete protection walls or walls, pylons, beacons, parked vehicles and/or non-classified objects such as, for example, a lost load of a vehicle traveling ahead, a tree and/or further static objects in the surroundings of the vehicle. The detection of static objects can sense a plurality of obstacles and/or boundaries one behind the other. For example, the detection can sense a plurality of obstacles along the road such as pylons and a crash barrier behind it or a sod of grass, a crash barrier behind it and trees further behind that.

Roadside development can be defined as a progression of boundaries of a road in the surroundings of a vehicle. Examples of road developments are rows of pylons, crash barriers, walls and/or a row of parked vehicles. In order to estimate the progression of a roadside development it is necessary to sense obstacles which can be assigned to a roadside development and to select them from a set of all the available obstacles. An obstacle which can be assigned to a roadside development and is relevant for the progression of the roadside development in the surroundings of a vehicle is also referred to below as a support point. An efficient method is described below for the determination of a support point or a plurality of support points.

In the text which follows, a preferred exemplary embodiment of the invention will be described with reference to the appended drawings. Further details, preferred refinements and developments of the invention become apparent therefrom.

DETAILED DESCRIPTION OF THE DRAWINGS

Figure 1:
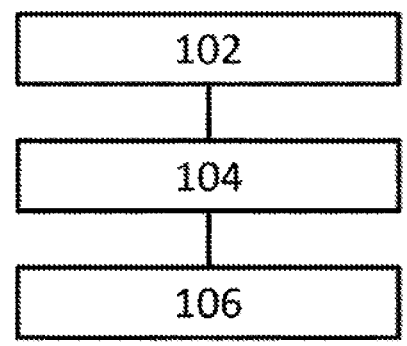
FIG. 1 shows in a schematic form an exemplary method for determining a support point.

In detail, FIG. 1 shows a method 100 for determining one or more support points for estimating a progression of a roadside development of a road. The method 100 determines the support point or support points exclusively by means of static obstacles in an environment or the surroundings of a vehicle. There is no need for the method 100 to calculate a group of trajectories. The method 100 can be executed iteratively. In each iterative step, support points can be newly determined. In addition, in each iterative step, a roadside development can be estimated from a preceding step. The estimation of the progression of the roadside development can therefore be adapted iteratively by using newly determined support points. How frequently the method 100 is executed can depend on the duration of a computing cycle of a control unit of the vehicle on which the method 100 is executed.

The method 100 can ascertain 102 a position of a first support point from a set of given obstacles in the surroundings or an environment of the vehicle. The method can preferably ascertain all the obstacles and/or the positions of all the obstacles in the surroundings of the vehicle and make them available to the method 100 as a set of given obstacles. An obstacle can be a static obstacle.

The method 100 can also determine 104 one or more regions in a direction of travel of the vehicle on the basis of the position of the first support point and/or of an estimated position of a roadside development. In addition, the method 100 can determine one or more regions counter to the direction of travel of the vehicle on the basis of the position of a first support point and/or of an estimated position of a roadside development. The number of regions in the direction of travel and/or counter to the direction of travel can be permanently predefined.

Figure 2:
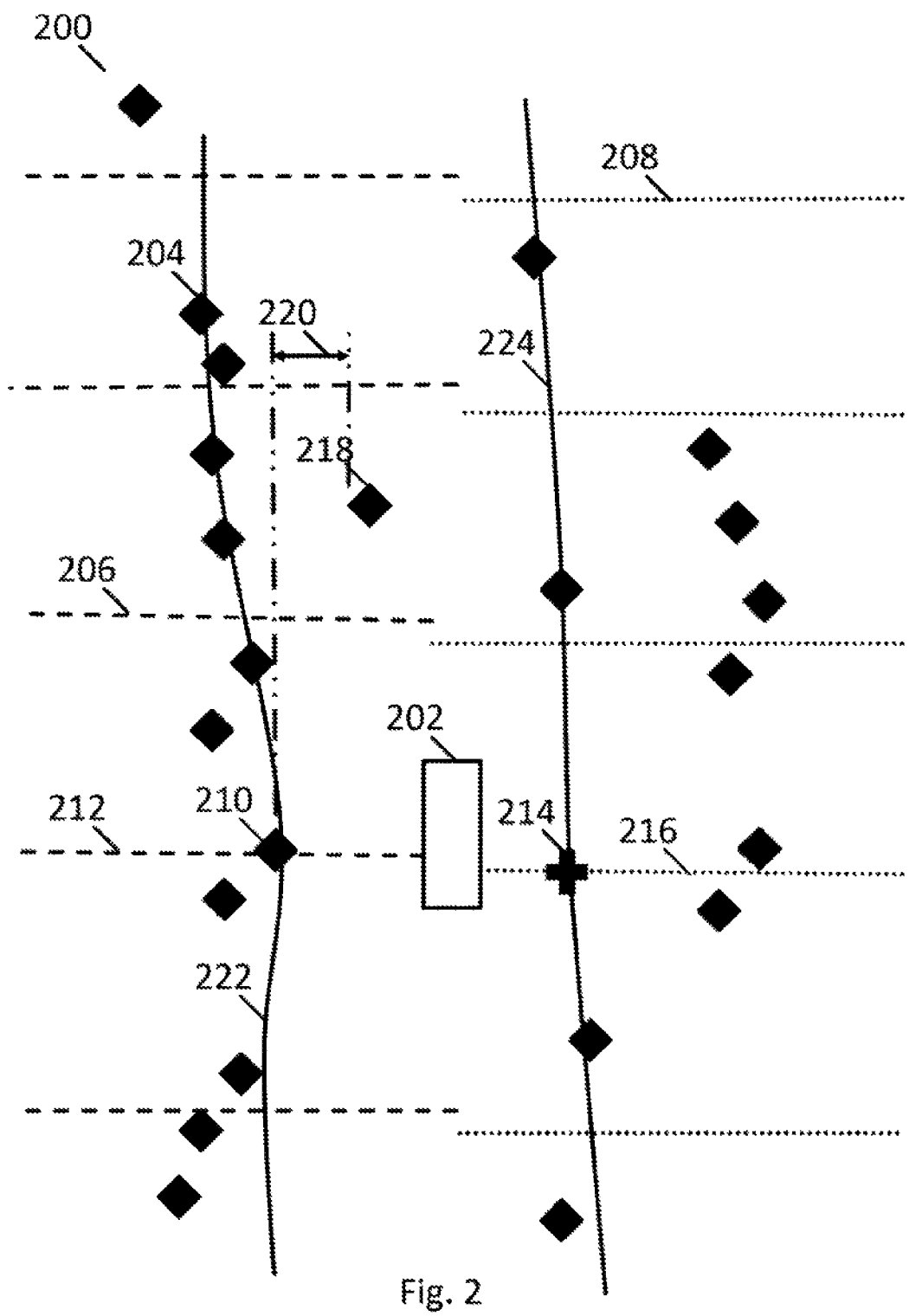
FIG. 2 shows in a schematic form an example of a traffic scenario.

FIG. 2 shows an exemplary traffic scenario 200. A vehicle 202 can detect the positions of the obstacles 204. In FIG. 2, all the lozenges represent an obstacle which has been ascertained or sensed by the vehicle. The lines 206 represent the boundaries of regions in the lefthand surroundings of the vehicle 202 in the direction of travel. The lines 208 represent the boundaries of regions in the righthand surroundings of the vehicle 202 in the direction of travel. The regions for the lefthand surroundings of the vehicle can be determined as a first support point on the basis of the position of the obstacle 210. The position of the obstacle 210 is preferably at the shortest lateral distance from the vehicle 202 in the lefthand surroundings of the vehicle 202. On the basis of the position of the obstacle 210 the method 100 can determine a boundary 212 which runs orthogonally with respect to the direction of travel of the vehicle and defines the boundary 212 of a region for the lefthand surroundings of the vehicle. Each region preferably has a predefined fixed length. By using the boundary 212 and the fixed predefined length for a region, the method 100 can determine the further boundaries of the regions of the lefthand surroundings in the direction of travel and/or counter to the direction of travel of the vehicle. In the traffic scenario 200 of FIG. 2, the method 100 determines three regions in the direction of travel of the vehicle 202 and one region counter to the direction of travel of the vehicle 202 for the lefthand surroundings of the vehicle 202.

The method 100 can additionally or alternatively determine the regions for the righthand surroundings of the vehicle 202 in the direction of travel. As shown in FIG. 2, the method for defining the regions can use an estimation of a roadside development 214, in particular an estimation of a position of a roadside development, as a first support point. The estimation of the roadside development 214 may have happened in a preceding iteration of the method 100. The estimation of the roadside development 214 is preferably at the shortest lateral distance from the vehicle 202 in comparison with the obstacles 204 in the lefthand surroundings of the vehicle 202. On the basis of the estimation of the roadside development 214, the method 100 can determine a boundary 216 which runs orthogonally with respect to the direction of travel of the vehicle and defines the boundary 216 of a region for the righthand surroundings of the vehicle 202. In a way analogous to the lefthand surroundings, each region of the righthand surroundings has a predefined fixed length. By using the boundary 216 and the fixed predefined length for a region, the method 100 can determine the further boundaries of the regions of the righthand surroundings in the direction of travel and/or counter to the direction of travel of the vehicle 202. In the traffic scenario 200 in FIG. 2, the method 100 determines three regions in the direction of travel of the vehicle 202 and one region counter to the direction of travel of the vehicle 202 for the righthand surroundings of the vehicle 202.

As shown in FIG. 2, the regions are arranged in uninterrupted rows on both sides of the surroundings, the lefthand surroundings and the righthand surroundings, of the vehicle 202. Within these regions it is possible to determine and/or select support points for the estimation of the roadside development or of the progression of the roadside development.

In detail, the method can determine 106 a set of support points of a roadside development for each of the determined regions in the direction of travel and/or counter to the direction of travel of the vehicle 202. The method 100 can preferably carry out the determination of the set of support points of the roadside development for the lefthand surroundings and righthand surroundings of the vehicle separately. The set of support points for each region is preferably first determined in the direction of travel of the vehicle 202 and subsequently the set of support points for each region is determined counter to the direction of travel of the vehicle 202.

In order to determine the set of support points, the method 100 can first determine a starting position in a region next to the vehicle. The starting position can be a position of an obstacle in the region next to the vehicle, which lies, in terms of lateral distance, closest to a current position of the vehicle. Alternatively, the starting position can be a position of a roadside development in the region next to the vehicle which has been estimated by the vehicle and which lies, in terms of lateral distance, closest to a current position of the vehicle. In the example in FIG. 2, the method 100 would ascertain the position of the obstacle 210 as a starting position for the region in the lefthand surroundings and the estimation of the position of the roadside development 214 as a starting position for the region in the righthand surroundings.

Starting from the respectively selected starting position of a region, the method 100 can determine a set of obstacles of the region and check for each obstacle from the set of obstacles of the region whether the obstacle is relevant for the determination of the set of support points. The obstacles from the set of obstacles are preferably run through sequentially in the direction of travel and checked. In other words, a subset of obstacles from the set of obstacles of a region which is relevant for the determination of the set of support points is ascertained. An obstacle is relevant and is incorporated into the subset of obstacles if there is no estimation of a roadside development and the lateral distance between a position of the obstacle and a preceding determined support point is not greater than a predefined maximum lateral distance. In FIG. 2, the obstacle 218 lies outside the maximum lateral distance 220 starting from the preceding support point 210. For this reason, the obstacle 218 is not incorporated into the subset of obstacles and is also consequently not used for the determination of a support point in this region.

Alternatively, an obstacle is relevant and is incorporated into the subset of obstacles if an estimation of a roadside development is present and the absolute value of the difference between the distance between the preceding determined support point and the roadside development and the distance between a position of the obstacle and the roadside development is not greater than a predefined maximum difference. From the subset of obstacles, the method 100 determines the support point as the support point of the region which is at the shortest lateral distance from the vehicle 202.

The method 100 can repeat the determination of the set of support points for regions counter to the direction of travel in order to determine support points behind the vehicle. This can improve the robustness of the estimation of the progression of the roadside development.

The support points in the direction of travel and those counter to the direction of travel can be transferred to a known estimation method for estimating the progression of the roadside development. The estimated progression of the roadside development for the lefthand surroundings is indicated by 222 and the estimated progression of the roadside development for the righthand surroundings is indicated by 224 in FIG. 2.

By defining the regions it is possible to classify the obstacles in the surroundings of the vehicle. This facilitates finding support points and improves the estimation of the roadside development and/or the progression of the roadside development. The method 100 can ascertain the progression of the roadside development without calculating a group of trajectories on the basis of support points. This reduces the required computational expenditure and the memory requirement of the method. As result, a robust estimation of the progression of the roadside development can be made available in real time on a control unit of the vehicle.

LIST OF REFERENCE NUMBERS

100 Method
102 Ascertaining a position of an obstacle
104 Determining a plurality of regions
106 Determining a support point
200 Traffic scenario
202 Vehicle
204 Obstacle
206 Boundary
208 Boundary
210 Obstacle
212 Boundary
214 Estimating a position of a roadside development
216 Boundary
218 Obstacle
220 Maximum distance
222 Estimated progression of the roadside development
224 Estimated progression of the roadside development

What is claimed is:

1. A method for determining support points for estimating a progression of a roadside development of a road, the method comprising:
ascertaining a first support point from a set of given obstacles in surroundings of a vehicle;
determining a plurality of regions in a direction of travel of the vehicle on the basis of the ascertained first support point; and
determining a set of support points of a roadside development for each of the determined regions.

2. The method according to claim 1, wherein at least one of:
the first support point in the surroundings of the vehicle is a position of an obstacle which lies, in terms of lateral distance, closest to a current position of the vehicle, in the surroundings of the vehicle; and
the first support point in the surroundings of the vehicle is a position of a roadside development which has been estimated by the vehicle and lies, in terms of lateral distance, closest to a current position of the vehicle, in the surroundings of the vehicle.

3. The method according to claim 1, wherein at least one of:
the set of support points in the lefthand surroundings of the vehicle in the direction of travel and the set of support points in the righthand surroundings of the vehicle in the direction of travel are ascertained;
a plurality of regions are determined on the basis of a position of the first support point in the lefthand surroundings of the vehicle in the direction of travel, and a plurality of regions are determined on the basis of a position of the first support point in the righthand surroundings of the vehicle in the direction of travel;
the position of the first support point in the lefthand surroundings of the vehicle in the direction of travel and the position of the first support point in the righthand surroundings of the vehicle in the direction of travel are different; and
the regions in the lefthand surroundings of the vehicle in the direction of travel and the regions in the righthand surroundings of the vehicle in the direction of travel are different.

4. The method according to claim 1, wherein at least one of:
each region has a predefined fixed length; and
the set of support points of a roadside development comprises at maximum one support point for each of the determined regions.

5. The method according to claim 1, wherein
the set of support points is determined separately for each of the regions in the lefthand surroundings of the vehicle in the direction of travel for a lefthand roadside development, and for each of the regions in the right-hand surroundings in the direction of travel for a righthand roadside development.

6. The method according to claim 1, wherein the determination of the set of support points of the roadside development for each of the determined regions comprises:
ascertaining a starting position in a region next to the vehicle, wherein the starting position is:
(i) a position of an obstacle in the region next to the vehicle which lies, in terms of lateral distance, closest to a current position of the vehicle; or
(ii) a position of a roadside development in the region the vehicle which has been estimated by the vehicle and which lies, in terms of lateral distance, closest to a current position of the vehicle.

7. The method according to claim 1, wherein the determination of the set of support points of the roadside development also comprises for each of the determined regions:
determining a set of obstacles of a region in the direction of travel of the vehicle;
ascertaining a subset of obstacles from the set of obstacles of the region, wherein an obstacle from the set of obstacles is incorporated into the subset if:
(i) there is no estimate of a roadside development and the lateral distance between a position of the obstacle and a preceding determined support point is not greater than a predefined maximum lateral distance; or
(ii) an estimate of a roadside development is present and the absolute value of the difference between the distance between the previous determined support point and the roadside development and the distance between a position of the obstacle and the roadside development is not greater than a predefined maximum difference;
and
determining one or more obstacles from the subset of obstacles which are at a predefined relative distance from the vehicle as the set of support points.

8. The method according to claim 1, further comprising:
determining a plurality of regions counter to the direction of travel of vehicle on the basis of the position of the obstacle; and
determining the set of support points of a roadside development for each of the determined regions counter to the direction of travel.

9. The method according to claim 1, further comprising:
estimating the progression of the roadside development of the road using the set of support points by means of the vehicle.

10. A non-transitory computer-readable medium for determining support points for estimating a progression of a roadside development of a road, wherein the computer-readable medium comprises instructions which, when executed on a computer or a control unit, carry out the acts of:
ascertaining a first support point from a set of given obstacles in surroundings of a vehicle;
determining a plurality of regions in a direction of travel of the vehicle on the basis of the ascertained first support point; and
determining a set of support points of a roadside development for each of the determined regions.

11. A system for determining support points for estimating a progression of a roadside development of a road, comprising:
a control unit configured to carry out the acts of:
ascertaining a first support point from a set of given obstacles in surroundings of a vehicle;
determining a plurality of regions in a direction of travel of the vehicle on the basis of the ascertained first support point; and
determining a set of support points of a roadside development for each of the determined regions.

12. A vehicle comprising the system for determining support points for estimating a progression of a roadside development of a road according to claim 11.

\* \* \* \* \*